United States Patent [19]

Ohtsuki et al.

[11] Patent Number: 4,526,837
[45] Date of Patent: Jul. 2, 1985

[54] MAGNETIC RECORDING MEDIUM

[75] Inventors: Akira Ohtsuki; Ryozo Konno; Makio Sugai; Masaharu Nishimatsu; Yuichi Kubota; Kazushi Tanaka; Osamu Shinoura, all of Tokyo, Japan

[73] Assignees: Toyo Ink MFG. Co., Ltd.; TDK Electronics Co., Ltd., both of Tokyo, Japan

[21] Appl. No.: 375,261

[22] PCT Filed: Aug. 28, 1981

[86] PCT No.: PCT/JP81/00204

§ 371 Date: Apr. 23, 1982

§ 102(e) Date: Apr. 23, 1982

[87] PCT Pub. No.: WO82/00914

PCT Pub. Date: Mar. 18, 1982

[30] Foreign Application Priority Data

Aug. 28, 1980 [JP] Japan .............................. 55-117812

[51] Int. Cl.³ .............................................. G11B 5/70
[52] U.S. Cl. .............................. 428/425.9; 252/62.54; 360/134; 360/135; 360/136; 427/44; 427/128; 427/131; 428/694; 428/522; 428/900; 428/704
[58] Field of Search ............ 428/900, 694, 695, 425.9, 428/522; 252/62.54; 427/44, 128, 131; 360/134–136

[56] References Cited

U.S. PATENT DOCUMENTS

| 4,068,040 | 1/1978 | Yamada et al. | 428/500 |
| 4,197,357 | 4/1980 | Huisman | 428/692 |
| 4,260,466 | 4/1981 | Shirahata et al. | 427/132 |
| 4,302,510 | 11/1981 | Umeki et al. | 428/403 |
| 4,323,596 | 4/1982 | Buxbaum et al. | 427/127 |
| 4,335,183 | 6/1982 | Hosaka | 428/336 |

Primary Examiner—Ellis P. Robinson
Attorney, Agent, or Firm—Wyatt, Gerber Shoup, Scobey and Badie

[57] ABSTRACT

This invention provides a magnetic recording medium with excellent electromagnetic characteristics and running durability. According to the invention, a magnetic powder is kneaded with a cross-linkable or polymerizable resin binder, together with a phosphoric ester having a polymerizable, unsaturated double bond or bonds, the resulting coating material is applied to a substrate, and then the coating is cross-linked or polymerized. The addition of the phosphoric ester in place of an ordinary dispersing agent improves the mechanical properties of the magnetic coating and the durability and running quality of the magnetic recording medium.

6 Claims, 2 Drawing Figures

FIG. 1
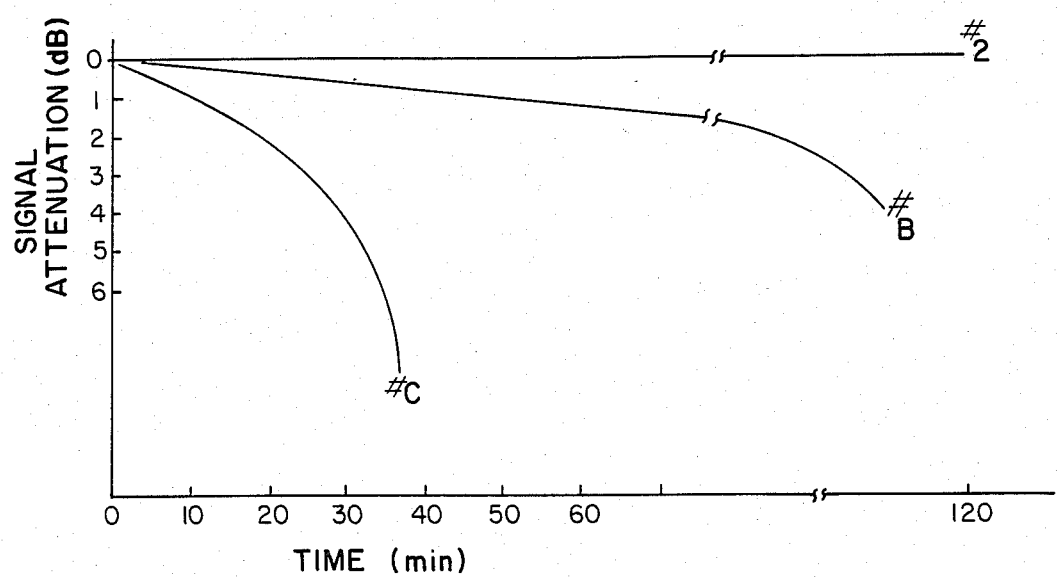
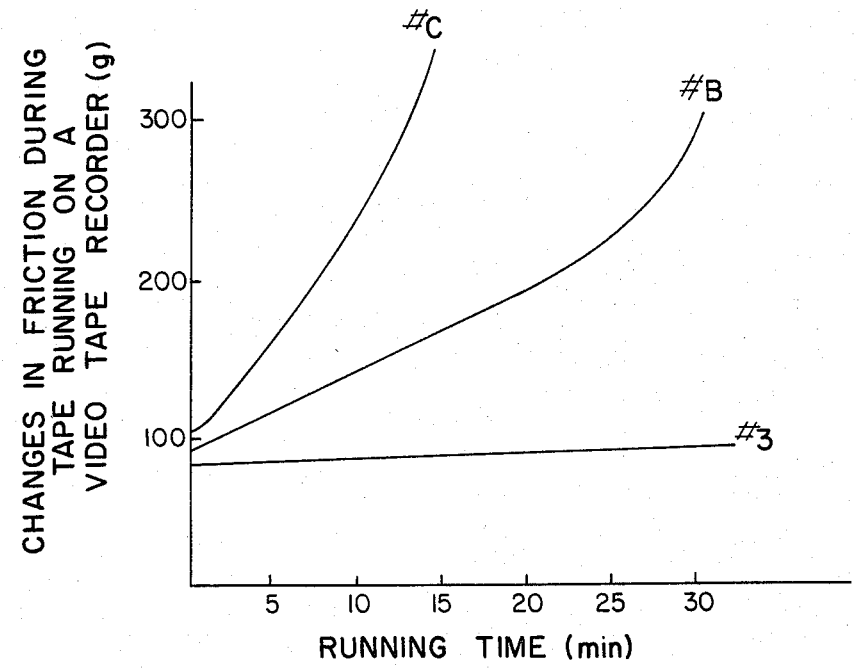
FIG. 2

MAGNETIC RECORDING MEDIUM

TECHNICAL FIELD

This invention relates to improvements in a magnetic recording medium for use as video tape, computer tape, high-performance audio tape, multicoated tape, magnetic disk, floppy disk, magnetic card, or the like.

BACKGROUND ART

In preparing a magnetic coating composition by mixing a resin binder with magnetic powder, for the manufacture of a magnetic recording medium, it is necessary to improve the mutual adhesion of the magnetic powder and the binder and also the dispersibility of the powder into the binder so that the product can attain better magnetic and electrical properties. To this end a variety of surface active agents are in use.

Attempts have been made to employ as dispersants for magnetic powder, e.g., higher aliphatic amines, higher fatty acids, phosphoric esters of higher alcohols, such as polyoxyethylene phosphate alkyl ethers, esters of higher fatty acids and sorbitol, sodium alkylbenzenesulfonate, betaine type nonionic surface active agents, and the like. The magnetic coatings of recording media, obtained by adding those surface active agents to magnetic coating compositions, exhibit uniform dispersion and high filling rates of the magnetic powder, good orientation where the powder is in the form of acicular particles, and other merits. On the other hand, the addition of such a surface active agent increases the frictional force that the coating surface develops as it slides past the magnetic head or the tape-control guide pins, or between the rotary cylinders, of a magnetic recording-playback system, or even reduces the strength of the magnetic coating or film. This often causes troubles with cassette tapes, video tapes, etc., such as stall with the tape twining round, or caught in, the head recorder system, problems of running tape, such as wow, flutter, jitter, and skew, and other troubles that stem from the weakened magnetic coating, including a drop in output, head clogging, frequent dropouts, and a decrease in reproduction output due to the deposition of the magnetic coating components on the parts forming the head gap of the system.

These troubles with the head recorder system arise particularly from operation under hot and humid conditions or at low temperatures. This is generally ascribed to the fact that the surface active agent of a low molecular weight that contributes to the uniform dispersion of the magnetic powder passes into the magnetic coating surface or unnecessarily plasticizes the binder, the other component of the coating film.

Thus, the greater the proportion of the surface active agent added for more uniform dispersion of fine magnetic particles, the more profound and the more widespread the aforementioned difficulties will be. The present invention is aimed at resolving the contradiction between the improvement in dispersibility of magnetic powder and the deterioration in running quality or wear resistance by the addition of a conventional surface active agent.

DISCLOSURE OF THE INVENTION

Briefly, in accordance with this invention, all the drawbacks that result from the contradictory effects of the conventional surfactants are successfully eliminated by the use instead of a phosphoric ester having at least one polymerizable, unsaturated double bond together with a cross-linkable or polymerizable resin binder.

The invention provides a magnetic recording medium made by coating a base with a magnetic coating material, prepared by kneading a magnetic powder with a cross-linkable or polymerizable resin binder, together with a phosphoric ester having at least one polymerizable, unsaturated double bond, and then effecting cross-linking or polymerization. Preferably, the magnetic recording medium uses, as the phosphoric ester having at least one polymerizable, unsaturated double bond, a product obtained by reacting a phosphoric ester of a compound having two or more hydroxyl groups with an acrylic or methacrylic compound having a functional group reactive with an isocyanate group and also with a polyisocyanate compound.

The invention also concerns a magnetic recording medium which uses, as the cross-linkable or polymerizable resin binder, a mixture of (A) a compound prepared by reacting a partly saponified vinyl chloride-vinyl acetate copolymer with a polyisocyanate compound and then reacting the resulting isocyanate-containing compound with an acrylic or methacrylic compound having a functional group reactive with the isocyanate group and (B) a compound prepared by reacting a polyol with a polyisocyanate compound and then reacting the resulting isocyanate-containing compound with an acrylic or methacrylic compound having a functional group reactive with the isocyanate group, in a mixing ratio of 20–95 wt%, preferably 50–90 wt%, (A) to 5–80 wt%, preferably 10–50 wt%, (B). Further, the invention resides in a magnetic recording medium in which the magnetic powder consists of an acicular cobalt-modified iron oxide and/or alloy particles.

The invention further provides a magnetic recording medium for which the cross-linking or polymerization is effected by exposure to radiation. It, in addition, provides a magnetic recording medium for which the cross-linking or polymerization is carried on in an inert gas stream.

The phosphoric esters having at least one polymerizable, unsaturated double bond include two major types; the reaction products of a phosphoric ester of a compound having two or more hydroxyl groups, an acrylic or methacrylic compound having a functional group reactive with an isocyanate group, and a polyisocyanate compound, and phosphoric esters of hydroxyalkylacrylates, such as "Kayamer P" and "Kayamer PM2" (both trademarks of products by Nippon Kayaku Co.).

As compared with the latter, the phosphoric esters of hydroxyalkylacrylates, the former utilizes the long-chain alkylether or polyester as the compound having two or more hydroxyl groups and therefore can give a magnetic recording medium with excellent electric, magnetic, and mechanical properties without adverse effects on the physical properties, such as flexibility and adhesion to the substrate, of a radiation-cured coating.

As regards the phosphoric ester having at least one polymerizable, unsaturated double bond, an example of synthesizing an ester by the reaction of a phosphoric ester of a compound having two or more hydroxyl groups, an acrylic or methacrylic compound having a functional group reactive with an isocyanate group, and a polyisocyanate compound will be cited below. First, 200 parts of a polyhydric alcohol (marketed by Sanyo Chemical Co., under the trade designation "PEG-400") is dissolved in 200 parts of benzene, 8.4 parts of phosphorus oxychloride, a reagent marketed by Tokyo Chemical Co., is added dropwise, while being cooled, to the solution, and the mixture is agitated at room temperature for about one hour. Next, a reaction of the solution is carried out in a nitrogen stream at 80° C. for 15 hours. From the reaction product unreacted phosphorus oxychloride and hydrochloric acid that has resulted from the reaction are extracted with distilled water. Benzene and water are removed by fractional distillation to obtain a phosphoric ester containing the hydroxyl groups of PEG-400 which occurs as a slightly yellowish paste at room temperature. The resultant is reacted with a 2-hydroxydiethyl methacrylate (2-HEMA) adduct of a polyisocyanate compound [toluene diisocyanate (TDI)]. The reaction product is typical of the phosphoric esters of polyhydric alcohols having radiation-curable unsaturated double bonds.

Among useful polyhydric alcohols for the invention are polyethers, polyols, and polyester polyols, such as "PEG 400", "PEG 600", and "PEG 1000" (all made by Sanyo Chemical Co.), "PTG 100", "PTG 300", and "PTG 500" (made by Nippon Polyurethane Ind. Co.), "ADEKA polyether P-400", "P-700", and "P-1000" (made by Asahi Denka Kogyo K.K.), and "San-ester 4610", "-2620" (both made by Sanyo Chemical). Examples of the polyisocyanate compounds useful for the invention are 2,4-toluene diisocyanate, 2,6-toluene diisocyanate, 1,4-xylene diisocyanate, m-phenylene diisocyanate, p-phenylene diisocyanate, hexamethylene diisocyanate, isophorone diisocyanate, and "Desmodur L" and "Desmodur IL" (both made by Farbenfabriken Bayer AG of West Germany).

The monomers having groups reactive with the isocyanate group and also having curable, unsaturated double bonds include: hydroxyl-containing esters, such as 2-hydroxyl ester, 2-hydroxypropyl ester, and 2-hydroxyoctyl ester, of acrylic and methacrylic acids; monomers having active hydrogen reactive with the isocyanate group and also having acrylic double bonds, such as acrylamide, methacrylamide, and N-methylolacrylamide; and monomers having active hydrogen reactive with the isocyanate group and also containing curable, unsaturated double bonds, such as allyl alcohols, maleic acid esters of polyhydric alcohols, and mono- and diglycerides of long-chain fatty acids having unsaturated double bonds.

The phosphoric ester to be used in accordance with the invention, which contains a polymerizable, unsaturated double bond or bonds, will polymerize with another phosphoric ester or with a resin binder having a polymerizable, unsaturated double bond or bonds, where such a binder is employed, upon application of radiation or heat. The polymerization eliminates the drawbacks that usually result from the use of conventional surface active agent. When cross-linking or polymerizing a magnetic coating material with heat, a polymerization initiator or the like may be used if necessary.

For use in the invention the cross-linkable or polymerizable resin binder is a resin having a polymerizable, unsaturated double bond or bonds or one having a hydroxyl, isocyanate, or other functional group or groups. It is preferably a resin having a polymerizable, unsaturated double bond or bonds. The addition of such a resin imparts radiation curability to the magnetic coating material. In the present invention, the resins that do not have any polymerizable, unsaturated double bond but can be cross-linked or polymerized by exposure to radiation may be employed as well. The use of thermosetting binders has its limitations in keeping up with the tendencies in the art toward much higher density recording and streamlining of production lines for magnetic recording media. On the other hand, where a radiation-curable resin composition is used, irradiation of the magnetic coating material with electron beams or the like will cause the unsaturated double bonds in the coating to form radicals, which in turn will initiate polymerization to produce a magnetic coating film of a three-dimensional network structure and cure it instantaneously at a low temperature. In this way a smooth magnetic coating surface is obtained through a simple process, without the necessity of after-curing. The use of a radiation-curable high-molecular compound will give a coating film of good physical properties which is rigid and yet highly flexible. The resin binders having a polymerizable, unsaturated double bond or bonds include the following:

I. Compounds prepared by reacting a partly saponified vinyl chloride-vinyl acetate copolymer with a polyisocyanate compound and then reacting the resulting isocyanate-containing compound with an acrylic or methacrylic compound having a functional group reactive with the isocyanate group;

II. Compounds prepared by reacting a polyol with a polyisocyanate compound and then reacting the resulting isocyanate-containing compound with an acrylic or methacrylic compound having a functional group reactive with the isocyanate group;

III. Reaction products of a compound having at least one epoxy group in the molecule and a monomer having groups reactive with the epoxy group and also having a curable, unsaturated double bond or bonds, at a rate of one molecule of the former to one or more molecules of the latter;

IV. Polyester compounds containing a curable, unsaturated double bond or bonds in the molecular chain; and V. Reaction products of a compound containing at least one carboxyl group in the molecule and a monomer having groups reactive with the carboxyl group and also having a curable, unsaturated double bond or bonds.

Desirably, (A) a compound prepared by reacting a partly saponified vinyl chloride-vinyl acetate copolymer with a polyisocyanate compound and then reacting the resulting isocyanate-containing compound with an acrylic or methacrylic compound having a functional group reactive with the isocyanate group and (B) a compound prepared by reacting a polyol with a polyisocyanate compound and then reacting the resulting isocyanate-containing compound with an acrylic or methacrylic compound having a functional group reactive with the isocyanate group are used in a mixing ratio of 20-95 wt%, preferably 50-90 wt%, (A) to 5-80 wt%, preferably 10-50 wt%, (B).

To cite examples of the compound (A), the resins obtained by reacting a hydroxyl-containing, partly saponified vinyl chloride-vinyl acetate copolymer, such as "Vinylite VAGH" (marketed by Union Carbide Corp. of the U.S.), with a 2HEMA adduct of TDI may be mentioned. Examples of the compound (B) are the resins, prepolymers, oligomers, and telomers having two acrylic double bonds at the end of the molecule, prepared, e.g., by reacting one mole of a bifunctional polyether (marketed by Asahi Denka Kogyo under the trade designation "ADEKA polyether P-1000"), obtained by adding propylene oxide to propylene glycol, with two moles of toluene diisocyanate and then with as much a-hydroxyethyl methacrylate.

The polyol component to be employed here may be chosen from among: polyfunctional polyethers, such as "ADEKA Polyether P-700", "ADEKA Polyether P-1000", and "ADEKA Polyether 1500" (all made by Asahi Denka Kogyo) and "Polymeg 1000" and "Polymeg 650" (both made by The Quaker Oats Co.); polyfunctional polyesters, such as "Polycaprolactone PCP-0200", "Polycaprolactone PCP-0240", and "Polycaprolactone PCP-0300" (all made by Chisso Corp.); saturated polyester resins prepared by the ester linkage of a saturated polybasic acid, such as phthalic, isophthalic, terephthalic, adipic, succinic, or sebacic acid, with a polyhydric alcohol, such as ethylene glycol, diethylene glycol, 1,4-butanediol, 1,3-butanediol, 1,2-propylene glycol, dipropylene glycol, 1,6-hexane glycol, neopentyl glycol, glycerin, trimethylolpropane, or pentaerythritol; and acrylic polymers containing at least one type of hydroxyl-containing acrylic or methacrylic esters as the polymer component.

Examples of the polyisocyanate compounds useful for the above purpose are 2,4-toluene diisocyanate, 2,6-toluene diisocyanate, 1,4-xylene diisocyanate, m-phenylene diisocyanate, p-phenylene diisocyanate, hexamethylene diisocyanate, isophorone diisocyanate, and "Desmodur L" and "Desmodur IL" (both made by Farbenfabriken Bayer AG of West Germany).

The monomers having groups reactive with the isocyanate group and also having radiation-curable, unsaturated double bonds include: hydroxyl-containing esters, such as 2-hydroxyethyl ester, 2-hydroxypropyl ester, and 2-hydroxyoctyl ester, of acrylic and methacrylic acids; monomers having active hydrogen reactive with the isocyanate group and also having acrylic double bonds, such as acrylamide, methacrylamide, and N-methylolacrylamide; and monomers having active hydrogen reactive with the isocyanate group and also containing radiation-curable, unsaturated bonds, such as allyl alcohols, maleic acid esters of polyhydric alcohols, and mono- and diglycerides of long-chain fatty acids having unsaturated double bonds.

Where the resin binder according to the invention is used with a compound having radiation-curable, unsaturated double bonds in a (A)-(B) mixing ratio (wt%) of 20-95, preferably 50-90, (A) to 5-80, preferably 10-50, (B), and where the compound (A) is a partly saponified vinyl chloride-vinyl acetate copolymer, e.g., "Vinylite VAGH" or the like, it will impart flexibility to the coating material but will prove somewhat inferior in radiation curability and adhesion to the base. The singular use of the compound (A) will present other problems, such as increased viscosity of the magnetic coating material. Then, a low-molecular compound excellently compatible with the compound (A) is used as the compound (B) so as to increase the cross-linking density, improve radiation curability, and impart good adhesion to the substrate. The use of such a low-molecular compound will lower the viscosity and improve the coatability of the magnetic coating material, allowing the high-molecular substance to improve the dispersibility of the magnetic particles in the coating compositions. Where a compound incapable of imparting excellent flexibility is used as the component (A), a compound capable of conferring radiation curability and adhesion to the base and which is satisfactorily compatible with the component (A) may be mixed with it as the component (B). If the component (B) is plastic, it will give flexibility to the cured coating film.

While the component (B) improves the dispersibility of magnetic particles, the use of a phosphoric ester having at least one polymerizable, unsaturated double bond in accordance with the invention imparts even better dispersibility to shorten the process of dispersion, with further improvements in the electric, magnetic, and mechanical properties of the resulting magnetic recording medium.

Also desirable cross-linkable or polymerizable resin binders according to the invention are the mixtures of a resin having at least one polymerizable, unsaturated double bond, such as acrylic, maleic, or allylic double bond, with a soft resin or a prepolymer, oligomer, or telomer thereof having the said double bond or bonds (with a dynamic modulus of less than $1 \times 10^9$ dyn/cm$^3$ at 20° C.).

In practice of the invention a solvent is employed. When the magnetic particles-to-binder ratio (by weight) is controlled within the range from 85:15 to 65:35 in view of the magnetic properties and the bonding ability required of the coating layer to be formed on the base film, the solvent is used to adjust the solids content of the magnetic coating material in the range of 20-60 wt%, preferably of 25-40 wt%. In this way a magnetic coating material with desirable application properties can be obtained.

There is no special limitation to the solvent, and a suitable one may be chosen in consideration of the binder solubility, compatibility, etc. It may, for example, be a ketone, such as acetone, methyl ethyl ketone, methyl isobutyl ketone, or cyclohexanone; an ester, such as ethyl formate, ethyl acetate, or butyl acetate; an alcohol, such as methanol, ethanol, isopropanol, or butanol; an aromatic hydrocarbon, such as toluene, xylene, or ethylbenzene; an ester, such as isopropyl ether, ethyl ether, or dioxane; or a furan, such as tetrahydrofuran or furfural. These are used as either a single solvent or mixed solvent.

The substrate to be coated with the magnetic coating material in accordance with the present invention may be the polyethylene terephthalate film that is in wide sue as a base material for magnetic recording media. Where heat resistance is an important consideration, a polyimide film, polyamide film or the like may be utilized. In the case of a polyester film as a thin base, it is often used after monoaxial or biaxial orienting. Other applications include coating of paper.

The magnetic particles which may be used in the present invention are $\gamma$-Fe$_2$O$_3$, Fe$_3$O$_4$, Co-doped $\gamma$-Fe$_2$O$_3$, Co-doped $\gamma$-Fe$_2$O$_3$-Fe$_3$O$_4$ solid solution, Co-base-compound-coated $\gamma$-Fe$_2$O$_3$, and Co-base-compound-coated Fe$_3$O$_4$ (including those oxidized to an intermediate state between itself and $\gamma$-Fe$_2$O$_3$). (The term "Co-base compound" as used herein means cobalt oxide, cobalt hydroxide, cobalt ferrite, cobalt ion-adsorbates and the like which enable the magnetic powder to take advantage of the magnetic anisotropy of cobalt in improving its coercive force.) Also, the magnetic powder consisting essentially of a ferromagnetic metal element or alloy, such as Co, Fe-Co, Fe-Co-Ni, Co-Ni, or the like may be suitably employed. Such a fine magnetic powder is prepared in a number of ways, including wet reduction of the starting material with a reducing agent such as BH$_4$, a treatment of the iron oxide surface with a Si compound and subsequent dry reduction with H$_2$ gas or the like, and vacuum evaporation in a low-pressure argon gas stream. Fine particles of monocrystalline barium ferrite may be employed as well. The fine magnetic powder is used in the form of acicular or granular particles depending on the application of the resulting magnetic recording medium.

In the field of high-bias hi-fi sound cassette tapes, video cassette tapes, video tapes, master tapes for contact transfer printing and the like, the technical progress in recent years has been striking, and the market is fast growing. As a new addition to this field, a high-performance tape possessing both extremely desirable electromagnetic conversion characteristics and physical reliability has now been provided, in accordance with the present invention, by combining a binder according to the invention with a fine magnetic powder, especially a cobalt-modified acicular iron oxide (cobalt-doped or Co-base-compound-coated type) advantageous for high-density recording applications, or with acicular fine alloy particles having even greater coercive force.

For the magnetic coating material of the invention, it is advisable to use various additives usually employed for these applications, such as an antistatic agent, lubricant, dispersant, sensitizer, leveling agent, wear-resisting agent, and film-reinforcing agent, to suit the particular end use.

The phosphoric ester chosen in accordance with the invention, in an amount of 0.5–10 wt% on the basis of the magnetic powder weight, is dissolved, together with the powder, in a solvent represented by an aromatic hydrocarbon, such as toluene, a ketone, such as acetone, methyl ethyl ketone, or cyclohexanone, an alcohol, such as isopropyl alcohol or butanol, or an ester, such as ethyl acetate or butyl acetate. The mixture is thoroughly kneaded and agitated on a three-roll or high-speed-agitation mixer of kneader for uniform wetting of the magnetic powder. In this case, it is possible to add, at the beginning of operation, the binder as a magnetic film-forming component and other additives, such as antistatic agent, lubricant, and film-reinforcing agent. The resulting slurry is transferred to a ball mill, sand grind mill, or other dispersion equipment for a higher degree of dispersion of the magnetic particles to obtain a magnetic coating material. The coating material is applied on a base film (of polyester or the like), dried, and finished on the surface. Finally, the coated film is irradiated with radioactive rays, ultraviolet rays, or heat reays, so that the radicals produced by the polymerizable, unsaturated double bond or bonds contained in the phosphoric ester effect a polymerization or cross-linking reaction with the binder or of the phosphoric ester itself to give a substance of a higher molecular weight, which is incorporated into the binder as an ingredient. The phosphoric ester is thus characterized in that it contributes to the uniform dispersion of the magnetic powder and, without its migration to the magnetic coating surface which would otherwise adversely affect the physical reliability of the resulting tape, it plays an ideal role as a dispersant.

It is all the more desirable that a system using the dispersant according to the invention utilizes a resin binder having two or more unsaturated double bonds curable on irradiation.

The dispersing agent of the invention may also be combined with any of the binders commonly in use, e.g., those composed mainly of a thermoplastic resin or the thermosetting binders prepared by reacting the hydroxyl group content of a resin with an isocyanate compound.

The radioactive rays for use in cross-linking and curing the magnetic coating film in accordance with the invention may be electron beams from an electron-beam accelerator as the source, $\gamma$-rays from $Co^{60}$, $\beta$-rays from $Sr^{90}$, X-rays from an X-ray generator, or the like. The electron-beams from an electron-beam accelerator are particularly advantageously employed because of the ease of controlling the absorbed dose, introducing the source into the process line, and providing shield from the ionizing radiation.

With regard to the characteristics of electron beams for use in curing the magnetic coating film, it is desirable from the standpoint of transmissivity to adopt an electron-beam accelerator which operates with an acceleration voltage of 100–750 KV, preferably 150–300 KV, and effect the irradiation so that the absorbed dose may be in the range of 0.5–20 megarads.

In the case of a magnetic tape, in particular, the film of coating to be cured is thin, and therefore the adoption of the low-dosage electron-beam accelerator made by Energy Science Inc. of the United States ("Electro-curtain system") or the equivalent is extremely advantageous because of the ease with which the accelerator can be installed on the tape coating line and the shield can be established against secondary X-rays inside the apparatus.

Of course, the Van de Graff accelerator in extensive use as an electron-beam accelerator may be employed instead.

In radiation curing, exposure of the magnetic coating film to radiation in a stream of $N_2$, He, or other inert gas is important. A film of magnetic coating, which is very thickly filled with a magnetic pigment, is highly porous in structure. When it is exposed to electron beams in air, $O_3$ and the like produced by the irradiation for the cross-linking of the binder components will have an adverse effect, keeping the radicals formed in the polymer from effectively acting for the cross-linking reaction. The adverse effect is exercised not merely on the surface of the magnetic coating layer but also deep into the porous film, thus hampering the cross-linking of the binder. For this reason it is essential to maintain an inert gas atmosphere of $N_2$, He, $CO_2$ or the like around the portion to be irradiated.

BRIEF DESCRIPTION OF THE DRAWING

FIGS. 1 and 2 are characteristic curves of test specimens made in an example of the invention and in comparative examples.

BEST MODE OF CARRYING OUT THE INVENTION

Next, the present invention is illustrated by the following examples and comparative examples. Throughout these examples the "parts" are all by weight.

Before proceeding to the examples, typical methods of synthesizing dispersing agents and resins for use in the invention will be explained below:

EXAMPLE (A) FOR SYNTHESIS OF DISPERSING AGENT

Following the dissolution of 420 parts of "PTG 100" (the trademark of a Nippon Polyurethane product) in the same amount of benzene, 8.4 parts of phosphorus oxychloride (Tokyo Kasei's reagent, grade 1) was slowly added dropwise while being cooled. After agitation at a room temperature for about one hour, the temperature was raised to 80° C. and the mixture was caused to react with stirring for 15 hours. From the reaction product in the benzene solution unreacted phosphorus oxychloride and resulting hydrochloric acid were extracted with distilled water. Benzene and water were finally removed by fractional distillation under reduced pressure. A slightly yellowish phosphoric ester was obtained in a paste form at room temperature. After melting 120 parts of the phosphoric ester of "PTG 100" by heating, 5.0 parts of a TDI adduct, and 0.001 part each of tin octylate and hydroquinone were added, and then the mixture was allowed to react at 80° C. for 2 hours.

EXAMPLE (B) FOR SYNTHESIS OF DISPERSING AGENT

One thousand parts each of "Polycaprolactone PCP-0240" (a Chisso Corp. product) and benzene, and 8.4 parts of phosphorus oxychloride were reacted in the same manner as in the preceding synthesis example (a) to prepare a phosphoric ester of "PCP-0240", and 304 parts of this phosphoric ester was reacted with 12 parts of a TDI adduct and 0.002 part each of tin octylate and hydroquinone in the way described in the synthesis example (a).

(Synthesis of TDI adduct)

In an $N_2$ stream within a one-liter, four-necked flask, 348 parts of tolylene diisocyanate (TDI) was heated to 80° C., and then 260 parts of 2-hydroxyethyl methacrylate (2HEMA), 0.07 part of tin octylate, and 0.05 part of hydroquinone were added dropwise while the temperature inside the reactor was being controlled to be within the range of 80°–85° C. After the addition, the mixture was stirred at 80° C. for 3 hours to conclude the reaction. Following the conclusion of the reaction, the product was taken out and cooled. In this way a white paste of a 2HEMA adduct of TDI was obtained.

Next, examples for synthesis of binders will be given below:

(a) Synthesis of acrylic-modified vinyl chloride-vinyl acetate copolymer resin A five-liter, four-necked flask was charged with 750 parts of a vinyl chloride-vinyl alcohol copolymer*, 1250 parts of toluene, and 500 parts of cyclohexanone. The charge was dissolved with heat, the temperature was raised to 80° C., and 61.4 parts of a 2-hydroxyethyl methacrylate adduct of tolylene diisocyanate and then 0.012 part each of tin octylate and hydroquinone were added. The mixture was allowed to react at 80° C. in an $N_2$ stream up to an NCO reaction rate of 90% or above.

Following the conclusion of the reaction, the resultant was cooled and diluted with 1250 parts of methyl ethyl ketone.

The synthesized product thus obtained as a binder was designated (a).

*(Process for preparing a vinyl chloride-vinyl alcohol copolymer)
A vinyl chloride-vinyl acetate copolymer, with a vinyl chloride group-to-vinyl acetate group ratio of 75:25 and having an average polymerization degree of n=400, was used as the starting material. It was suspended in a mixed dispersion medium of water and a solvent, such as methyl isobutyl ketone (MIBK), with mechanical dispersion by an agitator or the like, to form a slurry-like suspension in which the resin was swollen.
Next, with the addition of a sodium hydroxide-sodium methylate mixture as a catalyst, and at a temperature in the vicinity of 80° C., the acetyl groups of vinyl acetate were saponified to hydroxyl groups. A stabilizer to prevent dehydrochlorination or a suspending agent to assure uniform suspension may also be employed.
Then, the catalyst and acetic acid produced by liberated acetyl groups were removed by water washing the slurry following the conclusion of saponification, to increase the stability of the resin. If necessary, a decoloration step for eliminating chlorine ions, etc. may be added to the process in order to deprive of the color taken on saponification.
The vinyl chloride-vinyl alcohol copolymer obtained by the foregoing saponification process was characterized by:
Vinyl chloride group content: 87.0%
Vinyl acetate group content: 0.3% or less
Vinyl alcohol group content: 12.6%
Polymerization degree: 330

(B) SYNTHESIS OF ACRYLIC-MODIFIED, POLYETHER TYPE END-URETHANE-MODIFIED ELASTOMER

Twenty-five parts of Nippon Polyurethane's "Polyether PTG-500", 32.5 parts of 2HEMA, 0.007 part of hydroquinone, and 0.009 part of tin octylate were placed in a reactor. The charge was dissolved by heating to 80° C., 43.5 parts of TDI was added dropwise while being cooled so that the temperature inside the reactor could be in the range of 80°–90° C. Following the conclusion of dropping, the mixture was caused to react up to an NCO reaction rate of not lower than 95%. The synthesized product was designated a binder (b).

EXAMPLE 1

A composition consisting of

| | |
|---|---|
| Acicular magnetic iron oxide $\gamma$-$Fe_2O_3$ (major axis 0.3μ, minor axis 0.04μ, Hc 11000 Oe) | 120 parts |
| Dispersing agent (prepared by the synthesis example (a)) | 4 |
| Solvent (methyl ethyl ketone:toluene 50:50) | 100 | was mixed by a powerful mixer for 3 hours, and the acicular magnetic iron oxide was thoroughly wetted with the dispersing agent.

Next,

| | |
|---|---|
| Vinyl chloride-vinyl acetate copolymer (Union Carbide's "Vinylite VAGH") | 15 parts |
| Thermoplastic polyurethane (B. F. Goodrich's "Estane 5703") | 15 |
| Solvent (methyl ethyl ketone) | 200 |
| Lubricant (stearic acid) | 3 parts | were mixed with the preliminarily treated magnetic powder by a high-speed mixer for 70 minutes. The resulting slurry was dispersed by a sand grind mill for 4 hours.

The magnetic coating material thus obtained was applied to a 12 μ-thick polyester film, magnetically oriented on a (1600-gauss) permanent magnet, and the solvent was dried away by an infrared lamp or hot air. The coating surface was smoothened and was irradiated with electron beams in an $N_2$ gas atmosphere by ESI's "Electro-curtain" type electron-beam accelerator at an acceleration voltage of 150 KeV with an electrode current of 20 mA to a total dosage of 5 mrads to effect a reaction of the irradiated dispersing agent. Although the structure of the reacted dispersing agent is not known, the bonding is presumably attributable to the attainment of a higher molecular weight due to radical polymerization of the dispersant components or to the bonding as a result of a radical reaction of the dispersing agent with the binder.

The tape so obtained was slitted into a ribbon 3.8 mm in width as an audio cassette tape (Specimen #1).

EXAMPLE 2

To the magnetic coating material obtained through dispersion on a sand grind mill in Example 1, 5 parts, on solids basis, of an isocyanate compound ("Desmodur L" made by Bayer AG) capable of cross-linking by a reaction with the functional groups composed mainly of the hydroxyl groups of the binder in the magnetic coating material was added. The both were mixed up by a mixer, and the mixture was immediately applied to a 12 μ-thick polyester film, magnetically oriented, dried, and the coated surface was smoothened. The coated film was held in a heat-treating oven at 80° C. for 48 hours.

Then, under the same conditions as in Example 1, the coated film was irradiated with electron beams, slitted into a 3.8 mm-wide ribbon as an audio cassette tape (Specimen #2).

COMPARATIVE EXAMPLE 1

A composition consisting of

| | |
|---|---|
| Acicular magnetic iron oxide γ-Fe$_2$O$_3$ | 120 parts |
| Dispersing agent (higher-alcohol phosphoric ester, Toho Chemical's "GAFAC RD 510") | 4 |
| Solvent (methyl ethyl ketone:toluene 50:50) | 100 | was treated in the same manner as described in Example 1. The resultant was again treated likewise with

| | |
|---|---|
| Polyvinyl chloride-vinyl acetate copolymer ("VAGH") | 15 parts |
| Thermoplastic polyurethane ("Estane 5703") | 15 |
| Solvent (methyl ethyl ketone) | 200 |
| Lubricant (stearic acid) | 3 | and a similar audio cassette tape (Specimen #A) was obtained.

Table 1 summarizes the results of measurements taken of the audio cassette tapes made in Examples 1 and 2 and in Comparative Example 1.

As shown in Table 1, the tapes that utilized the dispersing agent according to the invention were well comparable or slightly superior to the tape using a conventional dispersing agent as in Comparative Example 1, in the magnetic characteristics, specifically in the squareness ratio (Br/Bm), orientation (Br$^l$/Br$^{ll}$), and residual magnetic flux density (Br). No decrease in the dispersibility of magnetic particles was observed. On the other hand, there were notable distinctions between the two in the squeal of the tapes on repeated runs in a car stereo set under hot and humid conditions, durability in service, and in the running quality after repeated cycles of holding at low and high temperatures and high humidity. At 40° C. and 80% RH, the tape using an ordinary phosphoric ester type dispersing agent (Comparative Example) began to squeal after two hours of running and, in a durability test at 40° C. and 60% RH, the test tape stopped running after 30 reciprocating runs. In the other durability test at room temperature that followed storage under the prescribed temperature-cycle conditions, the tape came to a stop after only five runs, because the magnetic coating came off the

TABLE 1

| | Audio cassette tape characteristics | | | | | | |
|---|---|---|---|---|---|---|---|
| Specimen | Hc$^{(1)}$ (Oe) | Br$^{(1)}$ (G) | Br/Bm$^{(1)}$ | Br$^{(1)}$/Br$^{ll}$ | Tape Squeal$^{(2)}$ (Hr) | Recipro. Run Durability.$^{(3)}$ (No. of run) | Durability. Aft. Temp. cycles$^{(4)}$ (No. of run) |
| #1 (Example) | 380 | 1200 | 0.82 | 2.01 | Over 24 | 130 | 150 |
| #2 (Example) | 380 | 1200 | 0.81 | 2.00 | Over 24 | Over 150 | Over 200 |
| #A (Comp. Example) | 380 | 1200 | 0.81 | 1.99 | 2 | Stopped after 30 runs. | 5 |

Notes:
$^{(1)}$Measured by Toei Kogyo's orientation meter, Model "VSM-III", with the application of a magnetic field of 5000 G.
$^{(2)}$Determined with Matsushita Communication Ind.'s car stereo set, Model "National CX-318", at 40° C. and 80% RH.
$^{(3)}$Determined with MCI's car stereo set, Model "National CX-1147D", at 40° C. and 60% RH.
$^{(4)}$Each test specimen was held at 0° C. for 6 hours and then at 40° C. and 80% RH for 6 hours. This temperature cycle was repeated, and after the fifth cycle the specimen was set on Clarion Co.'s kassette deck, Model "PA-80gA" and tested for durability on repeated passage past the head at room temperature.

tape and deposited on the head.

The tapes #1 and #2, by contrast, exhibited stable levels of running durability both under the hot and humid conditions and after storage under the prescribed temperature-cycle conditions. Especially, the #2 tape displayed outstanding running quality. This is apparently ascribable to the fact that, in the accelerated reliability test under the hot and humid conditions and after storage under temperature-cycle conditions, the dispersant component remained inside the magnetic coating and would not affect the running quality of the tape, with its coating layer moving past the recorder head, and that, especially with #2, the isocyanate cross-linking brought a further improvement in the abrasion and wear resistance of the magnetic coating surface.

The poor results with the test tape of Comparative Example is explained by the fact that the conventional phosphoric ester as a surface active agent tends to concentrate on the surface of the magnetic coating, shifting toward the surface portion particularly at elevated temperature, high humidity, or after repeated temperature cycles, thus impairing the running quality of the cassette tape.

EXAMPLE 3

A composition consisting of

| | |
|---|---|
| Cobalt-coated acicular γ-Fe$_2$O$_3$ (major axis 0.4μ, minor axis 0.05μ, Hc 600 Oe) | 120 parts |
| Carbon black (for antistatic use, "Mitsubishi Carbon Black MA-600") | 5 parts |
| α-Al$_2$O$_3$ powder (0.5μ in particle size) | 2 |
| Dispersing agent (prepared by the synthesis example (b)) | 8 |
| Solvent (methyl ethyl ketone:toluene 50:50) | 100 | was mixed up by a ball mill for 3 hours, and the acicular magnetic iron oxide was thoroughly wetted with the dispersing agent.

Next, a binder mixture consisting of

| Resin (binder (a)) | 15 parts (on solids basis) |
|---|---|
| Resin (binder (b)) | 15 (on solids basis) |
| Solvent (methyl ethyl ketone:toluene 50:50) | 200 |
| Lubricant (higher fatty acid-modified silicone oil) | 3 | was mixed up and dissolved. It was placed into the ball mill where the magnetic powder had been treated in advance and the two were again mixed and dispersed into each other for 42 hours.

The magnetic coating material thus prepared was applied to a 15μ-thick polyester film. After magnetic field orientation, the coating was dried to remove the solvent, smoothened on the surface, and was hardened by irradiation in an $N_2$ gas atmosphere by an ESI "Electro-curtain" type electron-beam accelerator at an acceleration voltage of 150 KeV with an electrode current of 20 mA to a total dosage of 10 mrads.

The resulting film was slitted into a ½-in. ribbon as a video tape (Specimen #3).

The cross-linking of the magnetic coating film in the process described is understood to have resulted from the combination of cross-linking by radicalization of the acrylic double bonds and cross-linking by the radicals formed in the molecular chains of the vinyl chloride-vinyl acetate resin (possibly due to HCl removal, though it is yet to be clarified).

COMPARATIVE EXAMPLE 2

A composition consisting of

| Cobalt-coated acicular γ-$Fe_2O_3$ | 120 parts |
|---|---|
| Carbon black ("Mitsubishi Carbon Black MA-600") | 5 |
| α-$Al_2O_3$ powder (0.5μ in particle size) | 2 |
| Dispersing agent ("GAFAC RE 610") | 3 |
| Solvent (methyl ethyl ketone:toluene 50:50) | 100 | was treated in the same way as described in Example 3.

Further, using the same binders and other ingredients as employed in Example 3, a similar video tape (Specimen #B) was obtained.

COMPARATIVE EXAMPLE 3

A composition consisting of

| Cobalt-coated acicular γ-$Fe_2O_3$ | 120 parts |
|---|---|
| Carbon black ("Mitsubishi Carbon Black MA-600") | 5 |
| α-$Al_2O_3$ powder (0.5μ in particle size) | 2 |
| Dispersing agent ("GAFAC RE 610") | 3 |
| Solvent (methyl ethyl ketone:toluene 50:50) | 100 | was treated in the same manner as described in Example 3.

Next, a binder mixture consisting of

| "VAGH" | 15 parts (on solids basis) |
|---|---|
| "Estane 5703" | 15 (on solids basis) |
| Solvent (methyl ethyl ketone:toluene 50:50) | 200 |
| Lubricant (higher fatty acid-modified silicone oil) | 3 | was thoroughly mixed and dissolved. It was placed into the ball mill where the magnetic powder had been treated, and again the two were mixed and dispersed for 42 hours.

To the magnetic coating material so obtained was added 5 parts, on solids basis, of an isocyanate compound ("Desmodur L" made by Bayer AG) capable of cross-linking by a reaction with the functional groups composed mostly of the hydroxyl groups of the binder, and the two were thoroughly mixed by a mixer.

The magnetic coating material thus obtained was applied to a 15μ-thick polyester film, magnetically oriented on a (1600-gauss) permanent magnet, and the solvent was dried away by an infrared lamp or hot air. The coating surface was smoothened and the film was held in an oven at 80° C. for 48 hours. The resulting tape was slitted into a ½-in. wide ribbon as a video tape (Specimen #C).

FIG. 1 is a graph showing the rates of attenuation (on still reproduction) of signals with respect to the reproduction output, as measured by recording signals on the video tape specimens by a video tape recorder (Matsushita Electric's Model "NV-3120") for open reels conforming to the FIAJ unified standards and then by reproducing the still images with a tension of 200 grams applied on the take-up side by a spring balancer.

As is obvious from the graph, the cross-linking of the phosphoric ester and the binder by irradiation with electron beams gave the test specimen #2 a tough structure with a

TABLE 2

| Specimen | Rate of[1] Dropout Increase (%) | Frictional[2] Coeff. under hot-humid condition (40° C. 60% RH) | Deg. of[3] orientation (BrI/Br$^{III}$) |
|---|---|---|---|
| #3 (Example 2) | 120 | 0.5 | 2.1 |
| #B (Comp. Ex. 2) | 480 | 2.2 | 2.1 |
| #C (Comp. Ex. 3) | 890 | Not measurable | 2.0 |

Notes:
[1]Percentage of dropouts after 50 repeated reproductions on the basis of the dropouts on initial reproduction as 100%, as determined with the test tape set on a Matsushita video deck, Model "National Maclord 6600."
[2]The coefficient of friction measured with the test tape wound 45 deg. round, and drawn past, a 30 mm-dia. stationary cylinder of brass, hard chrome-plated, under a tension of 200 grams at a velocity of 5 mm/min.
[3]Measured by Toei Kogyo's orientation meter, Model "VSM-III", with the application of a magnetic field of 5000 G.

remarkably reduced signal attenuation, because the dispersing agent which would otherwise tend to increase the frictional coefficient of the tape during high-speed running and destroy the magnetic coating was mostly entrapped in the coating film with little chance of coming up to the surface layer, despite the rigorously abrasive condition due to a relative velocity of the magnetic film and the head as high as 11 meters a second. On the other hand, Specimens #B and #C of Comparative Examples indicated tendencies of deteriorated still characteristic as a result of migration of the dispersant added, i.e., the phosphoric ester of higher fatty acid as a surface active agent, toward the surface of the coating film. Especially, Specimen #C showed a very poor still characteristic, presumably because of a large percentage migration of the phosphoric-ester surfactant toward the surface due to the promotion of the binder cross-linking with the aid of the isocyanate groups.

FIG. 2 is a graphic representation of changes in friction of test video tapes with running time. Each tape was held for five days under changing conditions in five cycles, each starting with a temperature of −10° C. and a relative humidity of 0% and ending with 60° C. and 80%. After this period, the specimen was allowed to stand at room temperature for 24 hours. It was then set on the same video tape recorder as used for the still reproduction test, a tension analyzer marketed by Nippon Jido Seigyo Co., Model "IVA-500", was set between the head drum and the pinch roller of the recorder, and the changes in tension on the take-up side of the test tape with running time were measured.

This test permits evaluation of not only the friction coefficient level of the magnetic film itself of each test tape but also the degree of deterioration of tape running quality with exudation of the low-molecular components from the magnetic film, and stability of the tape against the environmental conditions such as temperature and humidity.

As can be confirmed from FIG. 2, the phosphoric ester according to the invention was securely retained in the magnetic coating film by the radical reaction with the binder in the coating material, and hence the friction of the video tape on the recorder was stable on a low level. Comparative Specimens #B and #C, by contrast, showed much exudation of the dispersing agent to the coating surface and underwent sharp changes in friction with the lapse of running time on the video tape recorder. This was particularly true with Specimen #C, presumably from the same reason as already explained for the drop of the still level.

Table 2 shows the rates of increase in dropout percentages on the basis of the number of runs of the tape specimens made in Example 2 and Comparative Examples 2 and 3, the test tapes' friction coefficients on running around and past a metal cylinder under hot and humid conditions of 40° C. and 60% RH, and degrees of orientation of the magnetic powder in the tapes as a measure of its dispersibility. All the specimens had high orientation degrees $(Br/Br^{11})$ of 2.0 or more, displaying the favorable effects of the phosphoric-ester type dispersants. As regards the frictional coefficients of the tapes on running past the metal cylinder under the hot and humid conditions, the tendencies in FIG. 2 were generally followed, #3 tape giving a low value while the others, especially #C, showing much higher values. As is the case with the still characteristic and the friction coefficients under varied conditions, the increase in dropouts is deemed an attribute intimately related with the strength of the magnetic coating film and the friction characteristic of the coating layer surface. It was confirmed by the experiments that the video tape (#3) which showed excellent still and friction characteristics was also stable in respect of the dropout increase after 50 repeated signal reproductions.

We claim:

1. A magnetic recording medium comprising a substrate and a magnetic recording layer, said magnetic recording layer comprising a coating material containing a magnetic powder dispersed in a radiation cross-linked or radiation polymerized mixture of a resin binder, together with from 0.5 to 10 wt% based on the weight of magnetic powder, of a phosphoric ester having at least one polymerizable, unsaturated double bond.

2. A magnetic recording medium according to claim 1, wherein said phosphoric ester having at least one polymerizable, unsaturated double bond is a product obtained by reacting a phosphoric ester of a compound having two or more hydroxyl groups with an acrylic or methacrylic compound having a functional group reactive with an isocyanate group and also with a polyisocyanate compound.

3. A magnetic recording medium according to claim 1, wherein said cross-linked or polymerized resin binder is a mixture of (A) a compound prepared by reacting a partly saponified vinyl chloride-vinyl acetate copolymer with a polyisocyanate compound and then reacting the resulting isocyanate-containing compound with an acrylic or methacrylic compound having a functional group reactive with the isocyanate group and (B) a compound prepared by reacting a polyol with a polyisocyanate compound and then reacting the resulting isocyanate-containing compound with an acrylic or methacrylic compound having a functional group reactive with the isocyanate group, in a mixing ratio of 20-95 wt% (A), to 5-80 wt% (B).

4. A magnetic recording medium according to claim 1, 2, or 3, wherein said magnetic powder consists of an acicular cobalt-modified iron oxide and/or alloy particles.

5. A magnetic recording medium according to claim 1, wherein said cross-linking or polymerization by exposure to radiation is carried on in an inert gas stream.

6. A magnetic recording medium according to claim 3, wherein the mixing ratio of A to B is 50 to 90 wt% (A) to 10-50 wt% (B).

* * * * *